(12) United States Patent
Sweet

(10) Patent No.: US 7,205,928 B1
(45) Date of Patent: Apr. 17, 2007

(54) AUTOMATIC WEATHER RADAR SYSTEM AND METHOD

(75) Inventor: Steven R. Sweet, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/443,674

(22) Filed: May 31, 2006

(51) Int. Cl.
*G01S 13/95* (2006.01)
*G01S 19/89* (2006.01)
*G01S 13/00* (2006.01)
*G01S 13/08* (2006.01)

(52) U.S. Cl. .................. 342/26 B; 342/26 R; 342/73; 342/74; 342/75; 342/81; 342/118; 342/120; 342/159; 342/175; 342/176; 342/179; 342/181; 342/195

(58) Field of Classification Search .... 342/26 R–26 D, 342/73–81, 118, 120–123, 159–164, 175, 342/176, 179, 181, 189–197
See application file for complete search history.

(56) References Cited

U.S. PATENT DOCUMENTS

| | | | | |
|---|---|---|---|---|
| 3,623,093 | A | * | 11/1971 | Bollard et al. ............ 342/26 B |
| 3,781,878 | A | * | 12/1973 | Kirkpatrick ............... 342/26 B |
| 4,092,644 | A | * | 5/1978 | Hodge ...................... 342/26 B |
| 4,139,847 | A | | 2/1979 | Shimzu et al. |
| 4,346,595 | A | * | 8/1982 | Frosch et al. ............. 342/26 B |
| 4,533,915 | A | * | 8/1985 | Lucchi et al. ............. 342/26 B |
| 4,835,536 | A | | 5/1989 | Piesinger et al. |
| 4,940,987 | A | * | 7/1990 | Frederick .................. 342/26 D |
| 5,059,967 | A | * | 10/1991 | Roos ........................ 342/26 B |
| 5,077,558 | A | | 12/1991 | Kuntman |
| 5,198,819 | A | | 3/1993 | Susnjara |
| 5,202,690 | A | * | 4/1993 | Frederick .................. 342/26 B |
| 5,311,183 | A | * | 5/1994 | Mathews et al. ......... 342/26 B |
| 5,311,184 | A | | 5/1994 | Kuntman |
| 5,392,048 | A | | 2/1995 | Michie |
| 5,398,033 | A | | 3/1995 | Michie |
| 5,488,375 | A | | 1/1996 | Michie |
| 5,523,759 | A | | 6/1996 | Gillberg et al. |
| 5,563,604 | A | | 10/1996 | Brandao et al. |
| 5,646,624 | A | | 7/1997 | Cope et al. |
| 5,781,146 | A | * | 7/1998 | Frederick .................. 342/26 B |
| 5,828,332 | A | * | 10/1998 | Frederick .................. 342/26 B |
| 5,920,276 | A | * | 7/1999 | Frederick .................. 342/26 B |
| 5,945,926 | A | | 8/1999 | Ammar et al. |
| 6,043,756 | A | | 3/2000 | Bateman et al. |
| 6,154,169 | A | | 11/2000 | Kuntman |

(Continued)

Primary Examiner—Bernarr E. Gregory
(74) Attorney, Agent, or Firm—McDonnell Buchnen Hulbert & Berghoff LLP

(57) ABSTRACT

Methods and apparatus are provided for operating a radar system to provide a thunderstorm image to a pilot. The method comprises using one or more radar scans depending upon the aircraft altitude, a single upward tilted scan at or below a datum level of about 15,000±3000 feet wherein a clutter free storm image may be obtained and two scans above the datum level; a first upward tilting scan to determine, clutter free, a storm head perimeter and a second lower tilting scan for the storm body with ground clutter. The perimeter is used to discard return echoes from the second scan that lie outside the perimeter or an expansion thereof and retain those lying on or within the perimeter. The result is presented to the pilot. Optionally, the thunderstorm image is graded from center to edge so as to indicate weaker echo intensity near the edge.

20 Claims, 9 Drawing Sheets

U.S. PATENT DOCUMENTS

| | | | |
|---|---|---|---|
| 6,236,351 B1 * | 5/2001 | Conner et al. | 342/26 B |
| 6,388,607 B1 * | 5/2002 | Woodell | 342/26 B |
| 6,424,288 B1 | 7/2002 | Woodell | |
| 6,489,915 B1 * | 12/2002 | Lines et al. | 342/26 B |
| 6,501,392 B2 | 12/2002 | Gremmert et al. | |
| 6,512,476 B1 * | 1/2003 | Woodell | 342/26 B |
| 6,707,415 B1 | 3/2004 | Christianson | |
| 6,720,906 B2 | 4/2004 | Szeto et al. | |
| 6,738,011 B1 | 5/2004 | Evans | |
| 6,741,203 B1 * | 5/2004 | Woodell | 342/26 B |
| 6,879,280 B1 * | 4/2005 | Bull et al. | 342/26 B |
| 6,882,302 B1 * | 4/2005 | Woodell et al. | 342/26 R |
| 2003/0001770 A1 | 1/2003 | Cornell et al. | |
| 2003/0011505 A1 | 1/2003 | Szeto et al. | |
| 2003/0016156 A1 | 1/2003 | Szeto et al. | |
| 2004/0239550 A1 | 12/2004 | Daly, Jr. | |

* cited by examiner

AUTOMATIC WEATHER RADAR SYSTEM AND METHOD

TECHNICAL FIELD

The present invention generally relates to airborne radar systems and methods, and more particularly relates to airborne weather radar systems and methods.

BACKGROUND

Airborne radar systems are widely used to assist pilots in avoiding obstacles and unfavorable weather ahead of the aircraft. For convenience of description, the term "pilot" is intended to include any person who is operating and/or viewing the radar images and not merely the person who is controlling the aircraft and the terms "storm" or "storms" are intended to include any type of weather disturbance detectable by the radar but especially thunder storms. As used herein, the term "thunderstorms," whether singular or plural, is intended to refer to cumulonimbus storms. These are convective storms that have significant moisture content. Such storms usually involve rapidly rising and sometimes violent columns of moisture ladened air that can extend to high altitudes. Typical thunderstorms are often, for example and not intended to be limiting, 5 to 20 nautical miles (NM) wide and about 45,000 to 50,000 feet tall. They often produce internal lightening bolts and heavy turbulence, which can adversely affect aircraft passing through them. Thunder may occur as a natural consequence of the lightening. Other types of moisture containing storms, such as stratocumulous storms, usually occur at lower altitudes (e.g., less than about 15,000 feet) and extend over large distances, e.g., 50–200 nautical miles (NM). They generally lack the strong convective currents of thunderstorms and typically have less impact on aircraft. Accordingly, airborne weather radar systems are most often applied to the detection and avoidance of thunderstorms.

Several problems that can arise in connection with airborne weather radar systems are: (i) minimizing pilot involvement in detecting the presence of thunderstorms in the flight path, (ii) determining thunderstorm location and shape relative to the aircraft, (iii) presenting the thunderstorm image on the radar display in such manner that it is easy for the pilot to grasp its location, size and relative impact on aircraft operations, and (iv) reducing the terrain related background images (collectively referred to as "ground clutter") that can sometimes accompany thunderstorm images making them difficult to identify. Various approaches have been developed to deal with these problems. Automatic antenna scanning can be used to reduce the need for the pilot to manually steer the radar beam in the vertical dimension (referred to as manual antenna tilt). Color is used in the radar display to indicate radar return intensity, thereby giving visual feedback on the echo intensity in various directions and ranges. For example, green is often used for echoes from weak precipitation (e.g., from ~1 to ~4 mm/hr precipitation rate), yellow for echoes from intermediate precipitation (e.g., from ~4 to ~11.5 mm/hr precipitation rate), red for echoes from heavy precipitation (e.g., from ~11.5 to ~49.5 mm/hr precipitation rate) and magenta for echoes from extreme precipitation (e.g., more than ~49.5 mm/hr precipitation rate). Further, various techniques have been developed for removing at least some of the ground clutter from the radar returns presented to the pilot along with the weather data. However, a need for further improvement in weather radar systems and methods continues to exist.

Accordingly, it is desirable to provide improved weather radar systems and methods so that radar storm images, especially thunderstorm images, are more readily visualized and understood by the pilot, thereby facilitating operational comfort and improved safety. In addition, it is desirable that this be accomplished with minimal change to conventional radar hardware. Furthermore, other desirable features and characteristics of the present invention will become apparent from the subsequent detailed description and the appended claims, taken in conjunction with the accompanying drawings and the foregoing technical field and background.

BRIEF SUMMARY

A radar system apparatus is provided, adapted to display thunderstorm images to a pilot, substantially free of interfering ground clutter. The apparatus comprises an antenna, a radar transmitter/receiver (T/R) coupled to the antenna wherein the T/R and antenna generate an outgoing radar beam and receive returning radar echoes of the thunderstorm, an antenna steering control (ASC) coupled to the antenna for steering the radar beam, a processor coupled to the T/R and ASC for managing the T/R and ASC to direct the radar beam in particular directions in space, an aircraft flight data system (AFDS) coupled to the processor for providing flight parameter information to the processor, a memory coupled to the processor for storing operating instructions for the processor and for storing a data matrix of returning radar echo intensity received from particular azimuthal (X), elevation (Y) and range (R) coordinates in space, a display coupled to the processor for receiving from the processor a modified storm image for presentation to the pilot, and, optionally, a pilot operable control input coupled to the processor through which the pilot may initiate generation and presentation of a storm image on the display and alter the range settings. The processor manages the T/R, ASC and antenna in accordance with instructions and parameters stored in the memory depending upon current flight parameters (e.g., altitude) provided by the AFDS. For aircraft altitudes at or below a predetermined value (the "datum"), the beam-shaped radar signal is directed at the storm at an angle and range setting that permits detection of the storm substantially free of ground clutter. For aircraft altitudes above the predetermined datum, two or more scans are provided: (a) a first higher altitude (e.g., higher or upper beam tilt angle) scan to locate an upper portion of the thunderstorm referred to as the storm head substantially free of ground clutter, and (b) a second lower altitude (e.g., lower or lower beam tilt angle) scan to detect the storm body, especially the bright band region of the thunderstorm, along with unavoidable ground clutter. The processor then determines the perimeter of the storm head from the first scan and uses it to form a storm image mask stored in memory. In a preferred implementation, the processor expands this storm image mask by a predetermined amount. The storm image mask is then applied to the return echo data of the second scan to prune away echoes that lie laterally outside the storm image mask, thereby substantially removing the ground clutter. The resulting modified, de-cluttered, thunderstorm radar image is presented to the pilot via the display. In a further embodiment, the processor colorizes the de-cluttered storm image so that a central region color indicates strong storm echoes and a peripheral region color adjacent the perimeter of the thunderstorm indicates weak storm echoes.

Once launched, the system operates automatically without pilot intervention other than optional changes in range setting that may be performed by the pilot.

A method is provided for operating a radar system to present a thunderstorm image to a pilot. The method comprises, determining at least the aircraft altitude, then for altitudes in a first range (e.g., at or below the datum) using one or more radar beam scans at a predetermined beam elevation angle(s) to detect the storm substantially free of ground clutter and present the resulting storm image to the pilot, and for altitudes in a second range above the first range (e.g., above the datum) making at least two radar beam scans, a first scan at a first tilt angle to identify an upper portion of the storm (the storm head) substantially free of ground clutter, and a second scan at a second, lower tilt angle, to record an image of the storm and surrounding ground clutter (the storm body image), and then from the first scan determining a storm head image mask based upon the lateral extent of the storm head, then projecting that storm head image mask onto the storm body image obtained in the second scan and discarding storm body image echoes outside the storm head image mask, and then presenting the resulting modified thunderstorm image to the pilot. In a further embodiment, the perimeter of the storm head image mask is enlarged by a predetermined amount prior to being projected onto the storm body image. In a further embodiment, the predetermined amount of expansion is in the range of 5–15% of the lateral dimensions of the storm head. In a still further embodiment, the modified storm image intensity is graded on the outer 5–25% of the thunderstorm image area (the peripheral region) so as to show weaker echo intensity color in the peripheral region and stronger echo intensity color in the central region of the thunderstorm. Any residual clutter from especially prominent ground features may also be removed.

BRIEF DESCRIPTION OF THE DRAWINGS

The present invention will hereinafter be described in conjunction with the following drawing figures, wherein like numerals denote like elements.

DETAILED DESCRIPTION

Figure 1:
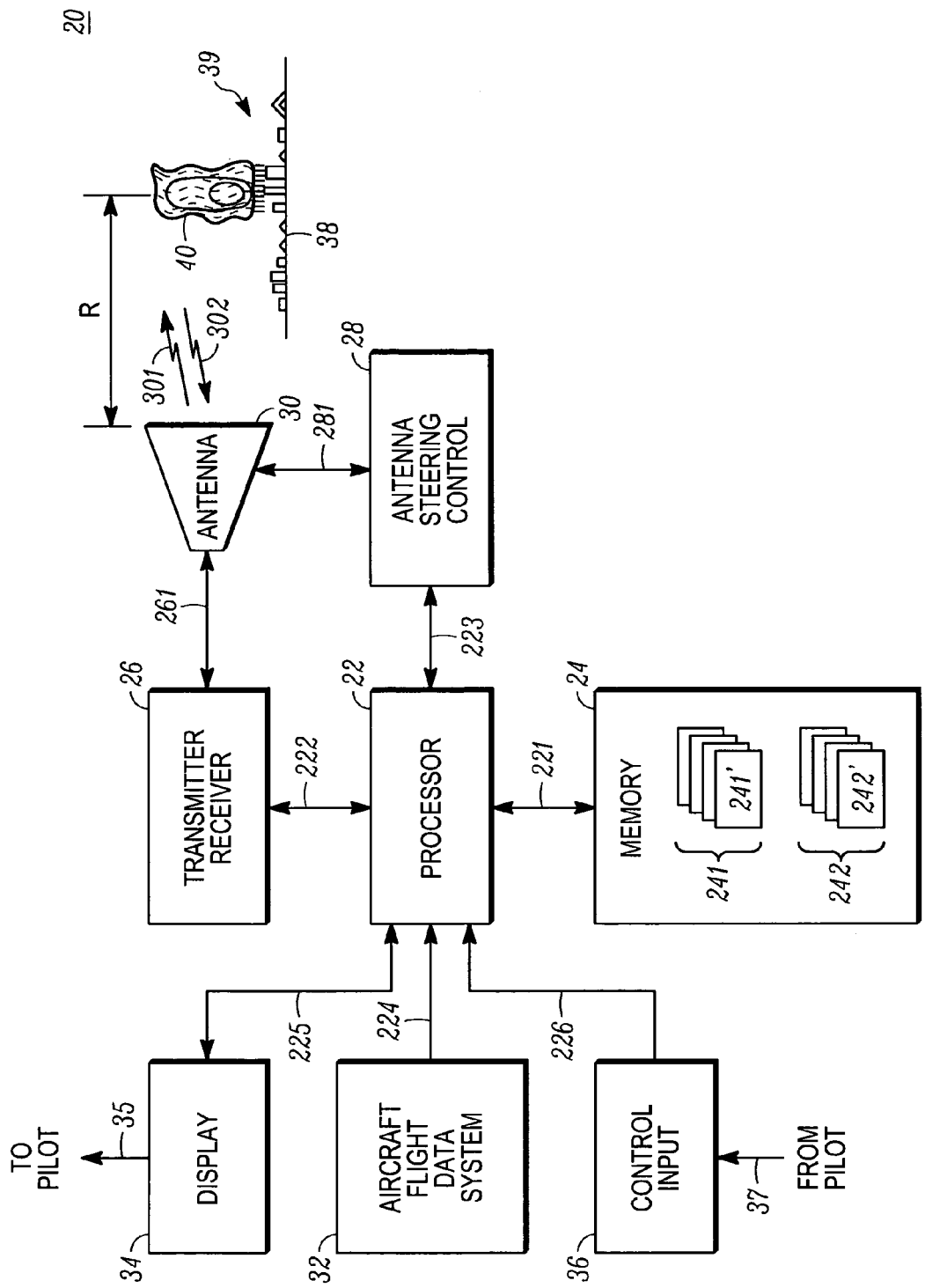
FIG. 1 is a simplified schematic block diagram illustrating a weather radar system according to an embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

For simplicity and clarity of illustration, the drawing figures illustrate the general manner of construction and method of operation, and descriptions and details of well-known features and techniques may be omitted to avoid unnecessarily obscuring the invention. Additionally, elements in the drawings figures are not necessarily drawn to scale. For example, the dimensions of some of the elements or regions in the figures may be exaggerated relative to other elements or regions to help improve understanding of embodiments of the invention.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements, but may include other elements not expressly listed or inherent to such process, method, article, or apparatus. The terms "left," "right," "in," "out," "front," "back," "up," "down," "top," "bottom," "over," "under," "above," "below" and the like in the description and the claims, if any, are used for describing relative positions and not necessarily for describing permanent positions in space. It is to be understood that the embodiments of the invention described herein are, for example, capable of operation in other orientations than those illustrated or otherwise described herein. The term "coupled," as used herein, is defined as directly or indirectly connected in an electrical or non-electrical manner.

FIG. 1 is a simplified schematic block diagram illustrating weather radar system 20 according to an embodiment of the present invention. System 20 comprises processor 22, memory 24, transmitter/receiver (T/R) 26, antenna steering control 28, antenna 30, aircraft flight data system (AFDS) 32, display 34 and optional control input 36. Processor 22 is coupled to memory 24 via link or bus 221, to transmitter/ receiver (T/R) 26 via link or bus 222, to antenna steering control 28 via link or bus 223, to aircraft flight data system (AFDS) 32 via link or bus 224, to display 34 via link or bus 225 and to control input 36 via link or bus 226. Antenna steering control 28 is coupled to antenna 30 via link or bus 281. T/R 26 is coupled to antenna 30 via link or bus 261. While FIG. 1 shows processor 22 coupled to elements 24–36 via separate links 221–226, this is merely for convenience of description and not intended to be limiting and processor 22 may be coupled to some or all of elements 2436 via one or more shared buses or individual links or combinations thereof. Either arrangement is useful.

The aircraft pilot can use input 37 to communicate with control input 36, thereby instructing system 20 to capture and display weather information, or operation can occur automatically, e.g., after power-up, or by other arrangements. Control input 36 communicates the pilot's request to processor 22 over link or bus 226. Processor 22 then retrieves the appropriate operating instructions and parameters from memory 24 and flight data from AFDS 32 and instructs T/R 26 to send an appropriate signal over link or bus 261 to antenna 30 so that antenna 30 emits radar signal 301 toward weather system, i.e., thunderstorm 40 at range R ahead of the aircraft above terrain 38. Objects or elements 39 on terrain 38 indicate structures or terrain features that can give rise to ground clutter in the path of transmitted radar signal 301. The words "ground clutter" refer to the radar image created by the radar echoes returned from terrain elements or features 39 (e.g., buildings, hills, mountains, valleys, towers, open land, farmland, tree covered areas, rocky-covered ground, grass-covered ground, desert and so forth). Processor 22 also instructs antenna steering control (ASC) 28 over link or bus 223 to send steering instructions to antenna 30 over link or bus 281 so that signal 301 is pointed (e.g., swept in azimuth and tilted in elevation) according to the program instructions stored in memory 24, thereby scanning the desired sector of space in front of the aircraft at predetermined elevation (tilt) angles and ranges depending on the current flight parameters. Signal 301 emitted by antenna 30 may be oriented or steered mechanically (e.g., by reorienting all or a portion of antenna 30) or electronically (e.g., using a phased array) or a combination thereof. Either arrangement is useful. As used herein the words "pointed," "steered," "oriented" and the like are intended to include any means for directing radar beam 301.

Returning radar echoes 302 are received by antenna 30 and sent via link 261 to T/R 26 where they are detected and their signal strength and timing information sent to processor 22 over link or bus 222. As used herein, the variables X and Y are intended to identify locations in space ahead of the aircraft in either Cartesian or angular coordinates, where X refers to a horizontal axis or azimuthal angle and Y refers to vertical axis or vertical angle also referred to as the "tilt angle." The variable R designates the range from antenna 30. Processor 22 relates returned radar echoes 302 detected by T/R 26 to information on the X,Y location or direction of transmitted radar signal 301 and the appropriate range gate for distance R. Location or angle information X,Y may be coupled to or returned from ASC 28 and range gate information defining distance R may be coupled to or returned from T/R 26. The present invention does not depend upon the particular arrangement for determining X,Y and R, and any convenient arrangement may be used. The exact arrangement for determining X, Y and R is not important provided that they are available within system 20. Processor 22 uses X,Y,R and echo intensity information I to construct a two-dimensional picture of radar echoes 302 returned by storm 40, which are then temporarily stored in matrix 241 of memory 24. Matrix 241 of stored radar echoes is referred to as the "WX-Target" (WX-T) matrix. If data for a single range gate setting corresponding to a single range $R=R_i$, is used, then each memory bin of two-dimensional WX-T(2D) memory matrix 241' stores the echo intensity I from a particular X,Y cell of space, referred to as a storm cell, in front of the aircraft at range $R_i$ (e.g., at coordinates $X,Y,R_i$). The storm cell at coordinates X,Y,R has a lateral and vertical size corresponding to the radar beam width and height, respectively, and a depth corresponding to the range gate depth at range R, where R can take on a variety of values $R_1$, $R_2, R_3, \ldots R_i, \ldots R_N$. In general, storms extend over much larger volumes than the volume of the storm cell measured by a typical radar beam.

In general, the heavier the precipitation in a particular storm cell, the more intense the radar echo from that storm cell. This gives localized information on the storm intensity I in each X,Y,R storm cell. Data from multiple ranges $R_1, R_2, R_3, \ldots R_N$ can be used so that a three-dimensional matrix of $X,Y,R_{1-N}$ data can be constructed and stored in 3D WX-T (3D) memory matrix 241. Stated alternatively, the 3-D memory matrix WX-T(3D) 241 corresponds to an N-deep array of 2-D memory matrices WX-T(2D) 241', where the data entered in each memory matrix bin corresponds to the echo intensity I from a storm cell of a size corresponding to the radar beam width, height and range gate depth at coordinates X,Y,R. In general, the storm cell width and height increase with range R since the radar beam diverges as a function of range R from antenna 30.

Figure 2:
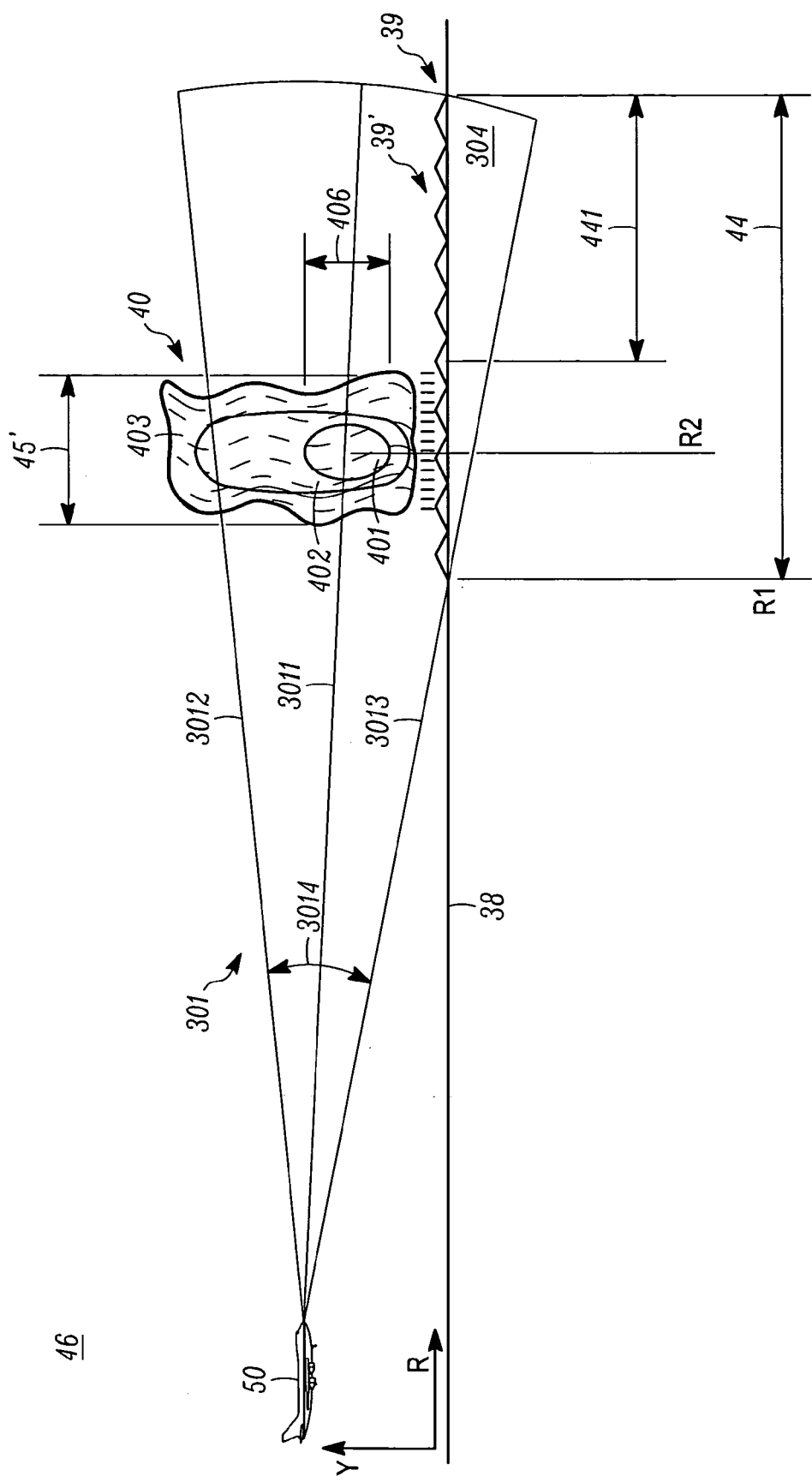
FIG. 2 shows a simplified schematic side view depicting an airplane carrying the weather radar system of FIG. 1 illuminating a thunderstorm with a radar beam.

FIG. 2 shows simplified schematic side view of scan 46 depicting airplane 50 carrying weather radar system 20 of FIG. 1, illuminating thunderstorm 40 with radar beam 301. In general, thunderstorm 40 has central region 401 of heavy precipitation, intermediate region 402 of intermediate precipitation and peripheral region 403 of light precipitation. "Bright band" 406 of thunderstorm 40 is that portion of the thunderstorm that provides the strongest radar return echo, and usually encompasses central region 401 of heaviest precipitation. Depending on the altitude, the precipitation can be in the form of rain, ice, sleet, graupel, hailstones and snow. The bright band is typically composed of water-covered hail-stones, which generally provide more intense reflections (radar echoes). The signal intensity of radar beam 301 is strongest along central ray 3011 and falls to a low level where no significant echoes result at peripheral rays 3012–3013 separated by vertical angle (vertical beam width) 3014. The strongest radar return is usually obtained from thunderstorm 40 when central ray 3011 of radar beam 301 passes through or close to bright band 406 encompassing central region 401. It will be noted that in addition to intersecting thunderstorm 40, radar beam 301 intersects terrain 38 and terrain features 39 for $R \geq R_1$. Terrain features 39 (e.g., buildings, hills, valleys, towers, and other man-made and natural features) in zone 44 within beam 301 tend to be strongly reflective. Thus, even though they are only illuminated by peripheral portion 304 of radar beam 301, they can give rise to ground clutter that interferes with detection of thunderstorm 40.

Figure 3:
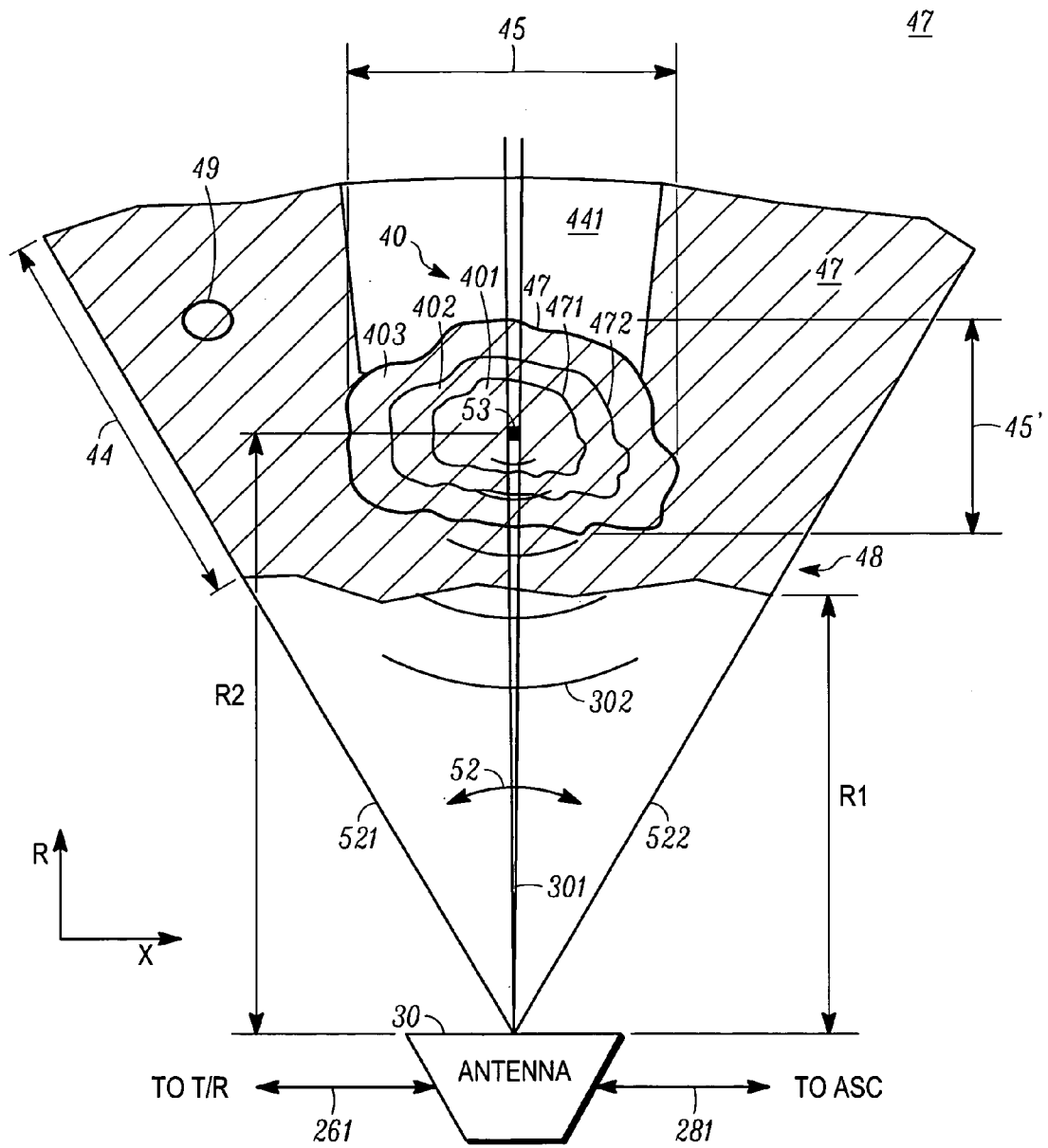
FIG. 3 shows simplified schematic plan-position indicator (PPI) presentation of a radar image of the thunderstorm of FIG. 2 together with associated ground clutter.

FIG. 3 shows simplified schematic plan-position indicator (PPI) presentation 47 of radar image 48 of thunderstorm 40 of FIG. 2 together with associated ground clutter 43 being picked up from terrain features 39 along with thunderstorm 40. Ground clutter 43 begins approximately at range R1 where radar beam 301 intersects terrain 38 and terrain features 39 and extends throughout ground clutter zone 44 except, perhaps, for shadow zone 441 behind storm 40.

Thunderstorm 40 centered at range $R_2$, has outer perimeter 47, with transverse (X-direction) width 45 and range (R-direction) depth 45'. In many cases, central zone 401 with perimeter 471, intermediate zone 402 with perimeter 472 and peripheral zone 403 with perimeter 47 may not be visible in ground clutter 43, which often has the same or greater intensity than regions 401, 402, 403 of thunderstorm 40. Thus, to the pilot, the only significant indication that a potentially dangerous thunderstorm lies ahead may be shadow zone 441 caused by absorption of radar beam 301 by storm 40 so that no significant echoes are received from terrain features 39' (see FIG. 2) in shadow zone 441 lying behind thunderstorm 40. Thus, thunderstorm radar image 41 can substantially disappear in ground clutter 43. Historically, various techniques well known in the art have been used to try to at least partially subtract out ground clutter so that the radar echo data stored in WX-T(2D) memory matrix 241' or WX-T(3D) memory matrix 241 relate more particularly to the thunderstorm alone. Techniques useful for removing ground clutter from radar weather images are described for example in U.S. Pat. Nos. 6,424,288 B1 and 4,139,847. However, many of the difficulties associated with removing dense ground clutter from composite thunderstorm plus ground clutter images may be avoided by use of the present invention. As explained below, processing the thunderstorm image according to embodiments of the present invention removes the low altitude ground clutter in which a thunderstorm image may be buried.

Figure 4:
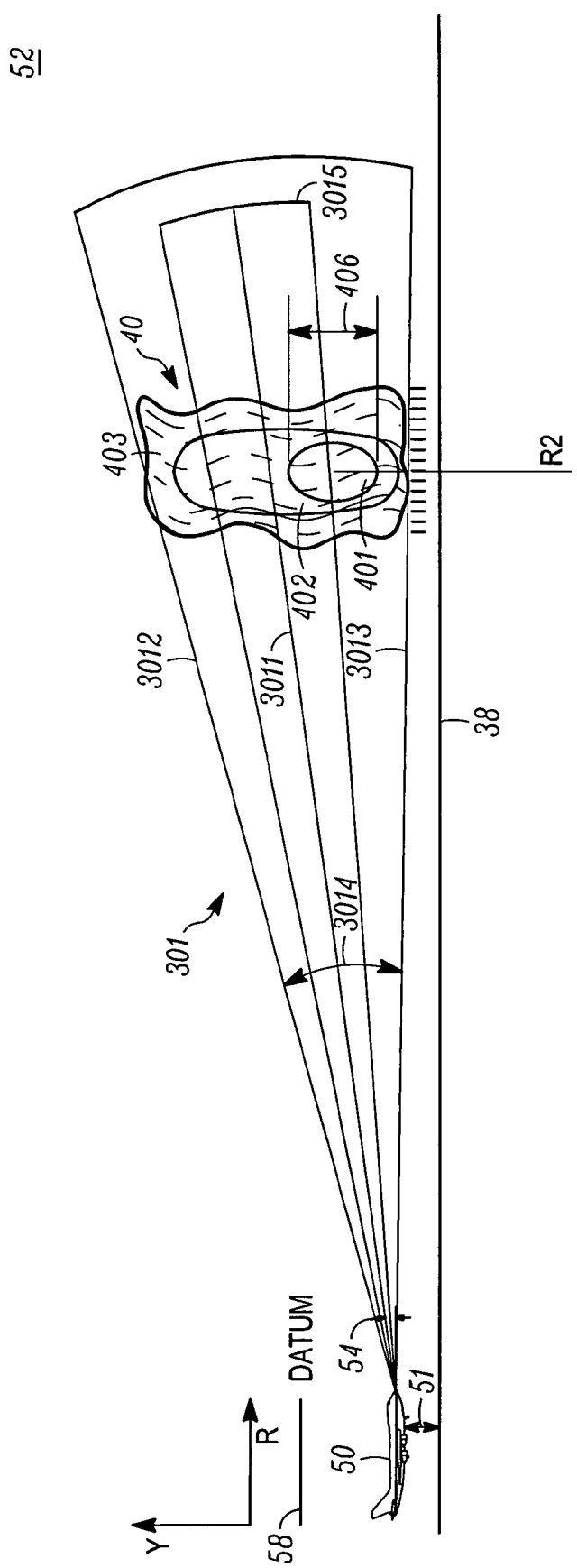
FIG. 4 shows a simplified schematic side view analogous to FIG. 2 but depicting an airplane flying below a predetermined altitude datum illuminating a thunderstorm with a radar beam of the type provided by the system of FIG. 1, according to a further embodiment of the present invention, wherein ground clutter is avoided.

FIG. 4 shows simplified schematic side view of scan 52 analogous to FIG. 2 but depicting airplane 50 flying below predetermined altitude datum 58 illuminating thunderstorm 40 with radar beam 301 by means of radar system 20 of FIG. 1, according to a further embodiment of the present invention wherein ground clutter is avoided. When aircraft 50 is flying at altitude 51 at or below altitude datum 58, radar beam 301 can be oriented at tilt angle 54 determined from the "upper scan" portion of Table I so that beam 301 encompasses storm 40 including bright band 406, but without significantly intersecting terrain 38. In this situation, no significant ground clutter appears and the scan results can be used directly and storm 40 can be easily seen on display 34. Datum 58 is conveniently about 15,000 feet, that is, in the range of 15,000±3000 feet. The preferred radar beam tilt angles above and below datum 58 are provided in Table I below. The preferred receiver attenuation settings, known in the art as the "STC" setting, vary as a function of aircraft altitude.

TABLE I

PREFERRED RADAR SETTINGS

| | | Upper Beam | | | Lower Beam | |
|---|---|---|---|---|---|---|
| # | Aircraft Altitude in kilo-feet | Radar Range Setting in NM | Approximate Radar Beam Tilt Angle in degrees | Receiver Attenuation (STC) setting in db | Approximate Radar Beam Tilt Angle in degrees | Receiver Attenuation (STC) setting in db |
| 1 | 0–5 | 50 | +6.0 | Normal | No lower scan | Not applicable |
| 2 | >5–10 | 50 | +5.0 | Normal | No lower scan | Not applicable |
| 3 | >10–15 | 100 | +3.5 | Normal | No lower scan | Not applicable |
| 4 | >15–20 | 100 | +4.0 | −15 | 0.0 | Normal |
| 5 | >20–25 | 100 | +3.0 | −15 | −0.7 | Normal |
| 6 | >25–30 | 200 | +3.0 | −15 | −1.5 | Normal |
| 7 | >30–35 | 200 | +2.0 | −15 | −1.8 | Normal |
| 8 | >35–40 | 200 | +2.0 | −15 | −1.9 | Normal |
| 9 | >40–45 | 200 | +1.5 | −15 | −2.0 | Normal |

Tilt angles are measured in a vertical direction with respect to level flight, wherein positive tilt angles indicate that central ray 3011 of radar beam 301 is directed upward with respect to level flight and negative tilt angles indicate that central ray 3011 of radar beam 301 is directed downward with respect to level flight. For example, assuming that the aircraft is below 5000 feet, then according to Table I, the radar is set to have about a 50 nautical mile (NM) range, antenna 30 is adjusted so that radar beam 301 is tiled up about +6.0 degrees from the horizontal and the radar speed-time-control (STC) (i.e., receiver sensitivity) is set for normal operation. This corresponds to the type of scan illustrated in FIG. 4. The STC setting controls the receiver sensitivity by determining how much attenuation is introduced in the receiver chain. For example and not intended to be limiting, "Normal" STC setting introduces about 40 db attenuation, and −15 db STC setting introduces about 40−15=25 db attenuation in the receiver chain. The different STC settings compensate for differences in echo intensity merely as a function of storm distance so that equally severe storms produce substantially equal intensity (e.g., color) signals on display 34, e.g., severe ("red") storms should appear "red" independent of their distance from the aircraft and likewise with other intensity levels. When altitude 51 approaches datum 58 or lies above datum 58, as is shown for example in FIGS. 5–6, then a two-step procedure is used for developing a substantially clutter free image of thunderstorm 40, a first "upper beam" scan and a second "lower beam" scan. This is discussed in more detail in connection with FIGS. 5–7.

Figure 5:
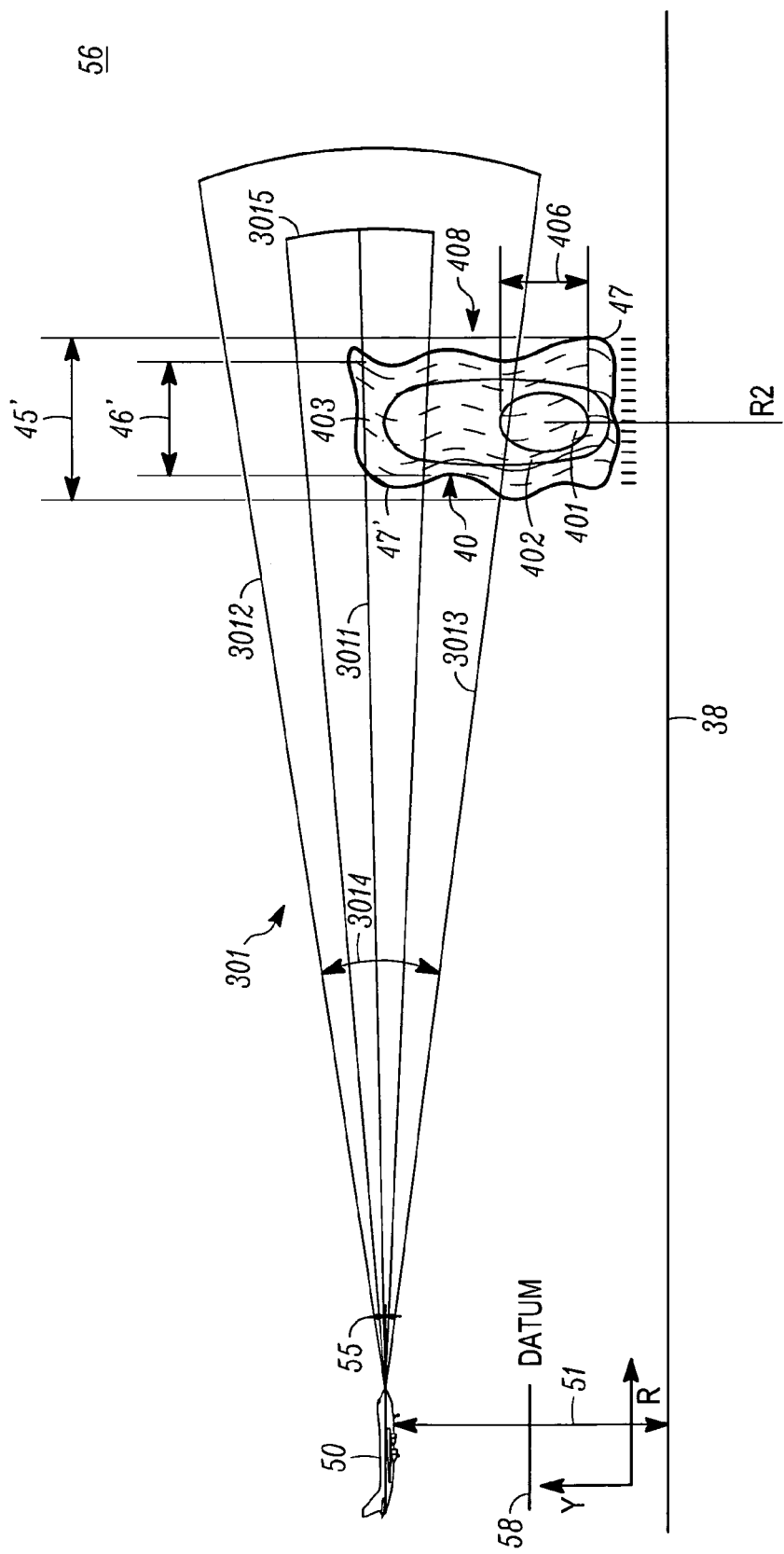
FIG. 5 shows a simplified schematic side view analogous to FIG. 4 but depicting an airplane flying above the predetermined altitude datum illuminating a thunderstorm with a radar beam of the type provided by the system of FIG. 1, according to a still further embodiment of the present invention, wherein the upper portion of the thunderstorm (the "storm head") is preferentially detected.
Figure 6:
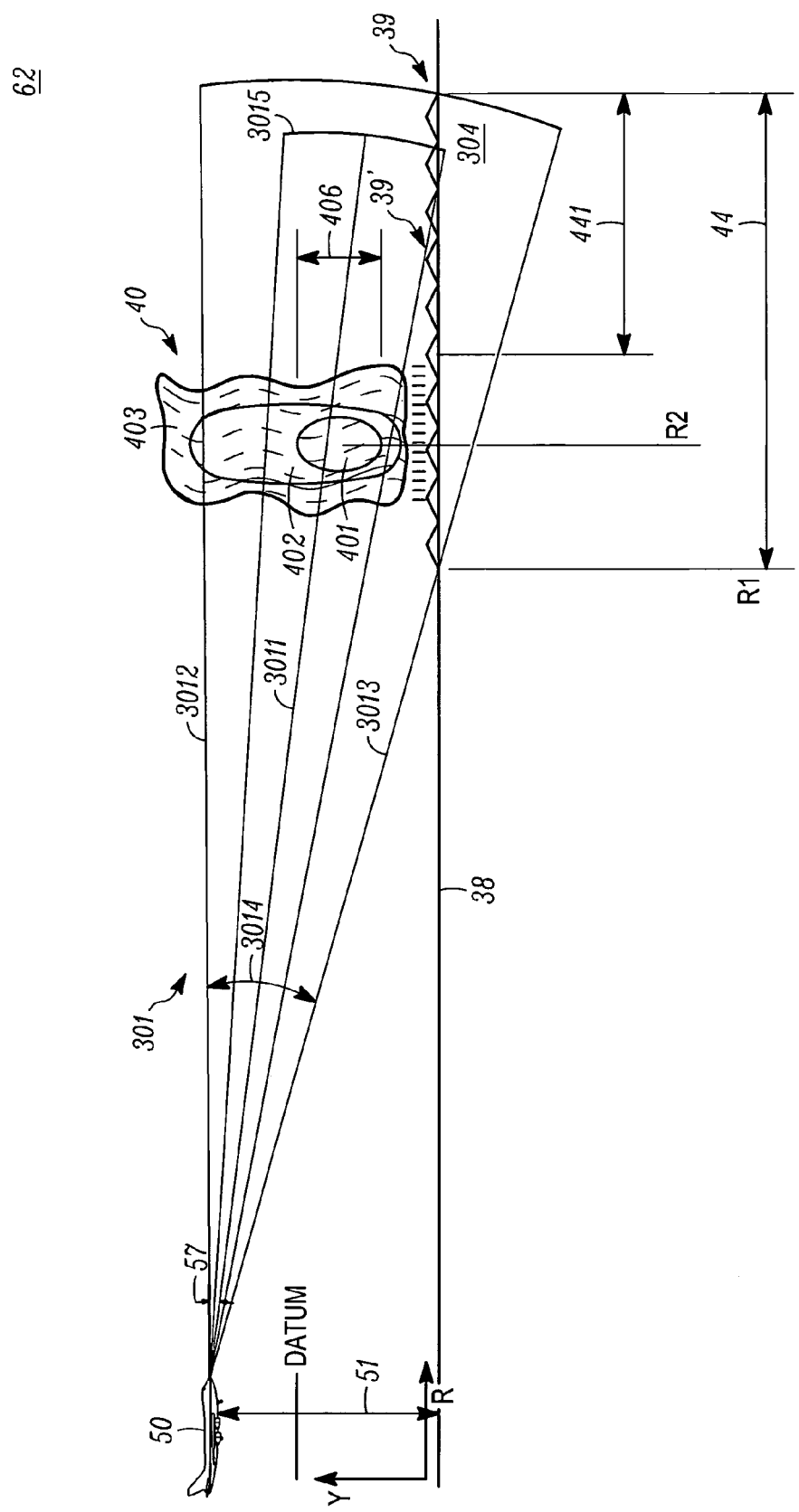
FIG. 6 shows a simplified schematic side view analogous to FIG. 5 depicting an airplane flying at substantially the same altitude as in FIG. 5 and illuminating a thunderstorm with a radar beam of the type provided by the system of FIG. 1, according to a yet further embodiment of the present invention, using a downward antenna tilt angle compared to the arrangement in FIG. 5 so that the bright band of the storm is detected along with associated ground clutter.
Figure 7:
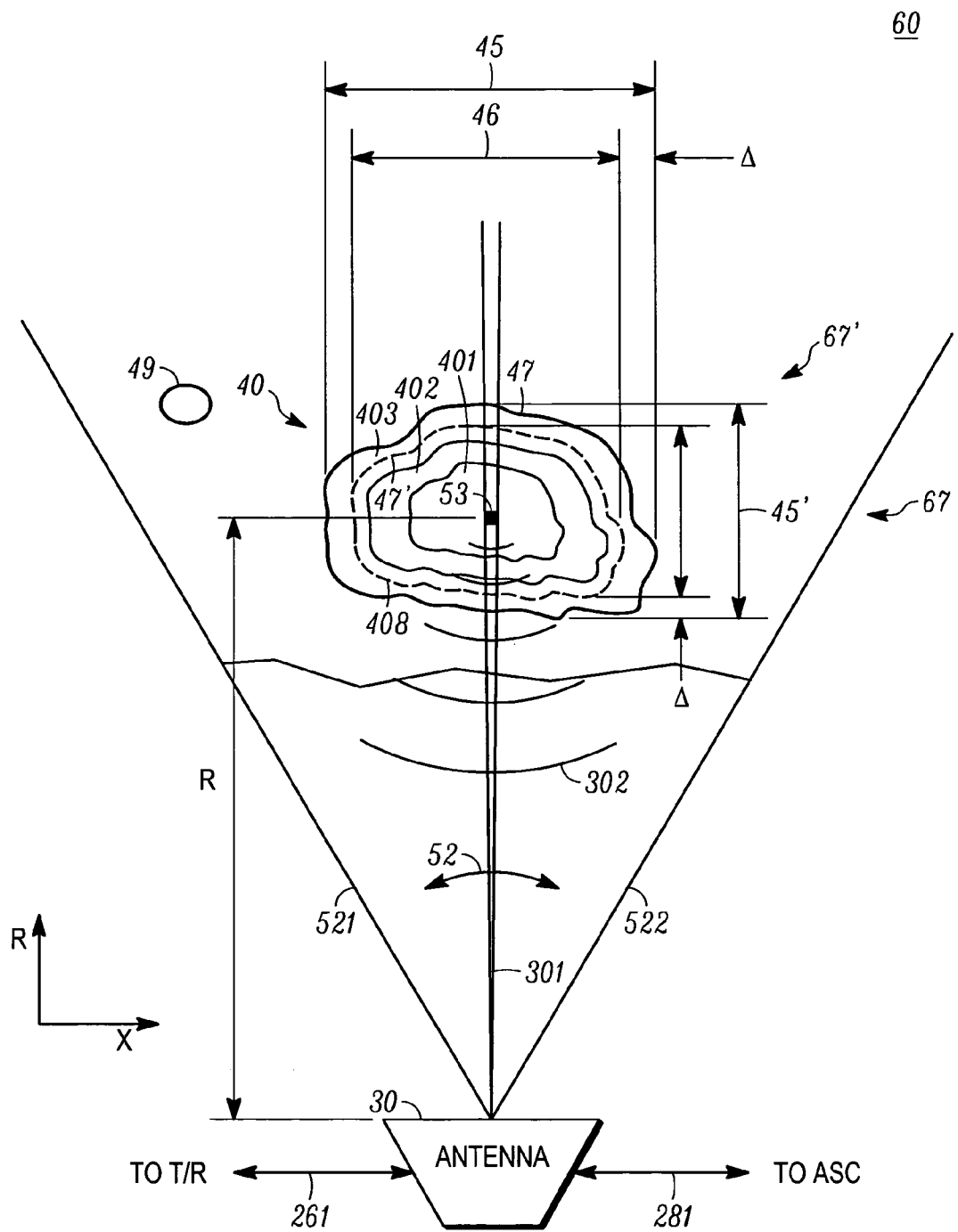
FIG. 7 shows simplified schematic plan-position indicator (PPI) presentation of the radar image of the thunderstorm of FIG. 6 wherein the radar image data gathered in FIG. 5 is applied to the radar image gathered in FIG. 6 to produce a modified, substantially clutter free, image of the thunderstorm of FIGS. 5–6.

FIG. 5 shows a simplified schematic side view of scan 56 analogous to FIG. 4 but depicting airplane 50 at altitude 53 located above predetermined altitude datum 58, illuminating thunderstorm 40 with beam 301 of radar system 20 of FIG. 1, according to a still further embodiment of the present invention, wherein an upper portion of thunderstorm 40 (i.e., "storm head" 408) is preferentially detected. The "upper beam" tilt angles specified in Table I are preferentially used depending upon the aircraft altitude above the datum level (e.g., above about 15,000 feet altitude). FIG. 6 shows a simplified schematic side view of scan 62 analogous to that of FIG. 5 depicting airplane 50 flying at substantially similar altitude 53, according to a yet further embodiment of the present invention, using a downward antenna tilt angle ("lower beam" scan angles) compared to the arrangement in FIG. 5 so that bright band 406 of storm 40 (i.e., the "storm body") is detected along with associated ground clutter zone 44. FIG. 7 shows simplified schematic plan-position indicator (PPI) presentation 60 of modified radar image 67 of thunderstorm 40 analogous to that of FIG. 3, but resulting from combining the results of the scans of FIG. 5 and FIG.

6 according to a further embodiment of the present invention to produce modified substantially clutter free thunderstorm image 67 of FIG. 7. Because of their close relationship, FIGS. 5–7 are discussed together.

In scan 56 of FIG. 5, tilt angle 55 is adjusted using the upper beam scan angle data provided in Table I so that storm head 408 having perimeter 47' with X-direction width 46 (see FIG. 7) and R-direction depth 46' (see FIGS. 5, 7) is preferentially detected, that is, cell 53 is scanned in azimuth and range at predetermined upper beam tilt angle 55 from table I so that storm head perimeter 47' (shown as a dashed line in FIG. 7) is identified. For example according to Table I, if the aircraft altitude is between 30,000 to 35,000 feet, then the range setting would be set to about 200 nautical miles (NM), the beam elevation angle would be set to about +2.0 degrees from the horizontal and the STC would be set at about −15 db. The radar beam vertical angle and range setting combine to limit the intensity of background clutter from terrain elements 39. By having the radar beam pointed above the horizontal, even though it is expanding vertically at greater distances from the aircraft, the distance at which it begins to strike the ground (e.g., terrain 38), thereby giving rise to ground clutter echoes, is large enough at these elevation angle settings so that the reflected ground clutter signal is substantially weaker than what would be reflected from storms whose principal reflection zone (e.g. "bright band" 406) typically extends from 8,000 to 16,000 feet above ground. In this manner, when a high (e.g., "upper beam") scan is performed, storm head 408, can be detected substantially free of ground clutter.

The result of scan 56, i.e., storm head perimeter 47', is stored in memory cells 241 of memory 24, forming the so-called WX-T mask scan. For convenience of explanation, the radar scan depicted in FIG. 5 is referred to as the "first" scan and the radar scan depicted in FIG. 6 is referred to as the "second" scan, but this is not intended to be limiting and the order of the scans can be interchanged. What matters is that radar echo intensity and position data be available from two scans, a higher tilt angle ("upper beam") type scan as shown in FIG. 5, and lower tilt angle ("lower beam") scan 62 as shown in FIG. 6, not the order in which the particular scans are performed. Thus, as used herein the words "first" (e.g., FIG. 5 type scan 56) and "second" (e.g., FIG. 6 type scan 62) merely serve to identify or distinguish these scans and not to indicate the order in which they are performed.

The results of the high angle, high altitude, upper beam first scan of FIG. 5 is image 67' of storm head 408 having perimeter 47' which is generally free of ground clutter 34. Processor 22 can identify storm head 401 without having to subtract out any significant ground clutter, except that produced, for example, by very tall terrain feature (point target) 49 (e.g., a mountain top). Only the small amount of ground clutter associated with point target 49 if any may need to be filtered out if desired. The result of the first scan is stored in memory cells 241. In general, since bright band 406 may not be included in image 67, the echo intensities in image 47' will likely be weaker than that obtained in the scans of FIGS. 4 and 6, but this is tolerable since there is no interfering ground clutter due to the upward tilt angle and/or higher altitude at which the first (upper beam) scan is made. This is referred to as the "storm head" or first scan and provides the storm head mask stored in memory cells 241. The second (lower beam) scan of FIG. 6, even though made at the same aircraft altitude 53 as the first scan of FIG. 5, will generally provide much more intense radar return echoes because of storm bright band 406 and ground clutter zone 304. Thus, the second scan is referred to as the "storm body" scan because it encompass bright band 406 even though it may also include significant ground clutter 43 from terrain features 39. The data from this second scan, the storm body scan data, is stored, for example, in data cells 242 of memory 24. By itself the second (FIG. 6) lower beam scan suffers from the same ground clutter problem as shown in FIG. 3, and the image obtained from the second scan will generally be image 48 of FIG. 3 with ground clutter 43. However, ground clutter 43 is removed from the second, storm body, scan data by use of the WX-T storm head mask obtained from the first (FIG. 5) upper beam scan.

In a preferred embodiment, before applying storm head mask 241 to remove ground clutter from storm body scan data matrix 242, processor 22 laterally expands periphery 47' to approximately match perimeter 47 of storm 40. This is desirable, since storm head 408 is generally slightly smaller than the body of storm 40, that is, width 46' is slightly smaller than width 45' and depth 46 is slightly smaller than depth 45. Widths and depths are usefully expanded by about 5–15 percent with about 7–12 percent being convenient and about 10 percent being preferred. Stated another way, modified thunderstorm image 47 has body (X-direction) width 45 and (Y-direction) depth 45' that are about 2Δ (see FIG. 7) larger than width 46 and depth 46' of image 47' of storm head 408, where 2Δ is usefully in the range of 5–15%, conveniently in the range of about 7–12% and preferably about 10% of width 46 and depth 46'. Processor 22 can use conventional edge detection techniques to identify outer perimeter 47' of storm head 408 in the X,R directions. The first (lower beam) scan echo intensity data within perimeter 47' can be deleted because the reflectivity data therein (e.g., intensity I) is not representative of the intensity of the thunderstorm in its lower section, e.g., more dangerous bright-band 406 of the storm below storm head 408. The reflection data I for the lower portions of the storm is obtained from the second (lower beam) scan wherein the radar beam is pointed at a tilt angle that encompasses the body of the storm, and in many cases also significant ground clutter. Processor 22 then projects the storm head echo image mask based on storm head 408 onto the second scan data. The second scan data is stored in the individual bins of WX-T memory matrix 242. The data corresponding to locations lying within perimeter 47' (unexpanded) or 47 (expanded) are retained and the radar return data (ground clutter) in memory bins corresponding to locations lying outside perimeters 47', 47 are discarded.

The thunderstorm radar image is also desirably colorized so that modified thunderstorm image 67 has the typical appearance of a storm. This is desirable because the initial echo intensity in cells in peripheral region 403 is sometimes perturbed by the ground clutter which exists around the edges of the conventional thunderstorm and which is collected during the second (lower beam) scan. Therefore, in this further implementation, the magnitudes of the echo intensity I stored in the various bins of the WX-T matrix 242 are modified as a function of position within storm outline 47', 47 so that when presented to the operator on display 34, outer periphery region 403 of storm image 67 adjacent perimeter 47 shows a low intensity (e.g., "green") echo, intermediate region 402 shows an intermediate intensity (e.g., "yellow") echo and central region 401 shows a strong intensity (e.g., "red and/or magenta") echo, or whatever color sequence is being used to convey echo intensity information to the pilot. It is desirable that the various (low, medium, high echo intensity) regions blend smoothly into one another since in an actual storm, the regions of variable precipitation intensity which are generally responsible for the different strength echoes, tend to blend smoothly into one another, rather than have hard borders, although that is not precluded. Peripheral "green" region of the storm usefully should be about 5–25% of the storm image area, conveniently about 7–20% and preferably about 10±3% of the storm image area.

Referring to FIG. 7, as a function of the area of modified storm image 67 within periphery 47: outer or peripheral region 403 desirably occupies about 10±3 percent of the total area within periphery 47, intermediate region 402 desirably occupies about 20±5 percent of the total area within periphery 47; and central region 401 desirably occupies about 70±5 percent of the total area within periphery 47. FIG. 7 also illustrates the situation where a mountain in the vicinity of storm 40 provides terrain related radar echo 49. This is referred to as a point source and is, generally, distinguishable from image 67 of thunderstorm 40 because it is much smaller in size. Thunderstorm image 67 in general will have widths 46, 45 and range depths 46', 45' of the order of tens of kilometers, whereas object 49 will generally have a width or range of a few kilometers or less. Echo 49 can be left on image 67 or removed by, for example, use of a low-pass filter. What is important is that clutter 43 (see FIG. 3) arising from near ground-level terrain features or elements 39 is not present in modified radar image 67 of thunderstorm 40. The small number of high terrain features that may remain are easily removed if desired using means well known in the art.

To summarize, when the aircraft is at or below a predetermined datum level, a single radar (upper beam) scan at a beam tilt angle depending upon the aircraft altitude can provide a substantially clutter-free storm image that can be used directly for presentation to the pilot. When the aircraft is above the datum level, it is desirable to use the return echo results and position data from at least two radar scans of storm 40 stored in WX-T memory matrices 241, 242. The first scan is an upper or storm head scan whose echo data is stored, for example, in WX-T memory matrix 241 to provide the storm head image mask. Only the storm head periphery information is important in determining the storm head image mask stored in WX-T memory matrix 241. A second lower altitude or lower tilt angle scan is performed either before or after the first scan, and the results (e.g., image 48 with ground clutter 43 of FIG. 3) stored, for example, in WX-T memory matrix 242. The echo returns from the second scan include storm generated echoes and generally also ground clutter generated echoes. The data entries in WX-T memory matrix 241 from the first, upper beam or storm head scan (e.g., the storm head echo image mask) are combined with the echo information stored in WX-T memory matrix 242 to separate the thunderstorm information from the ground clutter information. This is done by removing from WX-T memory matrix 242 echo intensity data for X, Y, R locations lying laterally outside of storm head image mask periphery 47' or expanded storm head image mask periphery 47 stored in WX-T matrix 241. This provides what is referred to herein as modified thunderstorm image 67. It is desirable that storm head image mask in WX-T matrix 241, be expanded laterally before being overlaid on WX-T matrix 242 to generate modified image 67 of perimeter 47 The size, shape and location of image 67 are determined by extending and broadening the image size of the thunderstorm head image 47' observed at the upper altitudes. In addition, if the resulting storm lacks a significant precipitation intensity gradient, the echo intensities in region 403 adjacent periphery 47, 47' are modified to show a typical green-yellow (or other color) variation for the thunderstorm edges. The resulting modified storm image 67 is stored in modified WX-T matrix 242 in memory 24, and is sent by processor 22 to display 34 in suitable form to be viewed by the pilot as indicated by display output 35. In this manner, the pilot is automatically presented with an image of an approaching thunderstorm without any need for pilot intervention or beam steering. Further the image presented on display 34 is easily recognizable as a storm so that potential evasive action is readily visualized. In circumstances where a high altitude ground feature lies in the vicinity of the storm that might interfere with possible flight paths through or around the storm and which may have been suppressed to increase visibility of the storm image, this ground feature image (e.g., image 49 of FIG. 3) can be presented on the same display in correct location relative to storm image 67 by, for example, providing an image of the terrain feature (e.g., feature 49) that alternates with an image of the storm or that flashes ON-OFF or showing it at the same time as the storm but in a contrasting color. In either case, modified thunderstorm image 67 is clearly distinguishable from the nearby terrain feature(s), e.g., feature 49.

Figure 8:
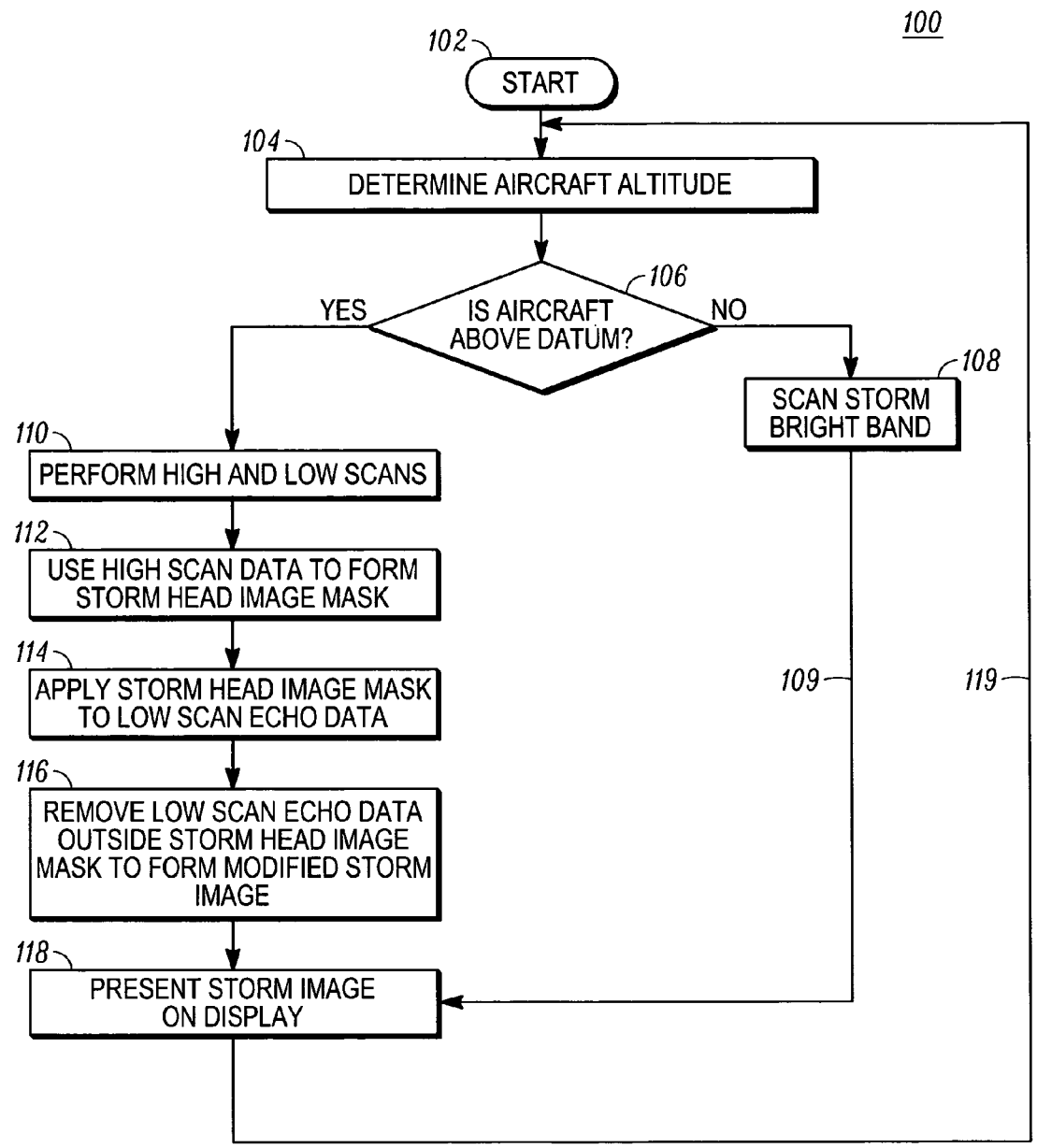
FIG. 8 is a simplified flow chart illustrating a method of providing weather information to a pilot, according to a still yet further embodiment of the present invention.

FIG. 8 shows a simplified flow chart illustrating method 100 of providing weather information to a pilot, according to a still further embodiment of the present invention. Method 100 begins with START 102 and desirable initial step 104 wherein the aircraft altitude is determined, e.g., from AFDS 32. Query 106 then determines whether the aircraft altitude determined in step 104 is at or above the predetermined datum, e.g., about 15,000 feet. If the outcome of query 106 is NO, then in step 108, system 20 performs a scan of thunderstorm 40 at an antenna tilt angle sufficient to include bright band 406 of thunderstorm 40 but without having radar beam 301 significantly intersect terrain 38 and ground elements 39 within the selected range. Then in step 118 the resulting substantially clutter free thunderstorm image is presented to the pilot on display 34, following which method 100 returns to START 102 and initial step 104 as shown by path 119. Persons of skill in the art will understand that presentation step 118 and return to START 102 via path 119 may occur substantially simultaneously.

If the outcome of query 106 is YES, indicating that aircraft 50 is above datum 58, then in block 110, first and second scans are performed in either order so that a first "high" or "upper beam" scan identifies storm head 408 and a second "low" or "lower beam" scan identifies the storm body and any associated ground clutter. In step 112, the results of the "high" scan are used to form the storm head image mask and in step 114, this storm head image mask is applied to the return echo data from the "low" scan. In step 116, the "low" scan return echo data laterally lying outside perimeter 47', 47 of the storm head image mask is deleted and in step 118 the modified, clutter-free storm image is presented on display 34. Method 100 then returns to START 102 and initial step 104 as shown by path 119.

Figure 9:
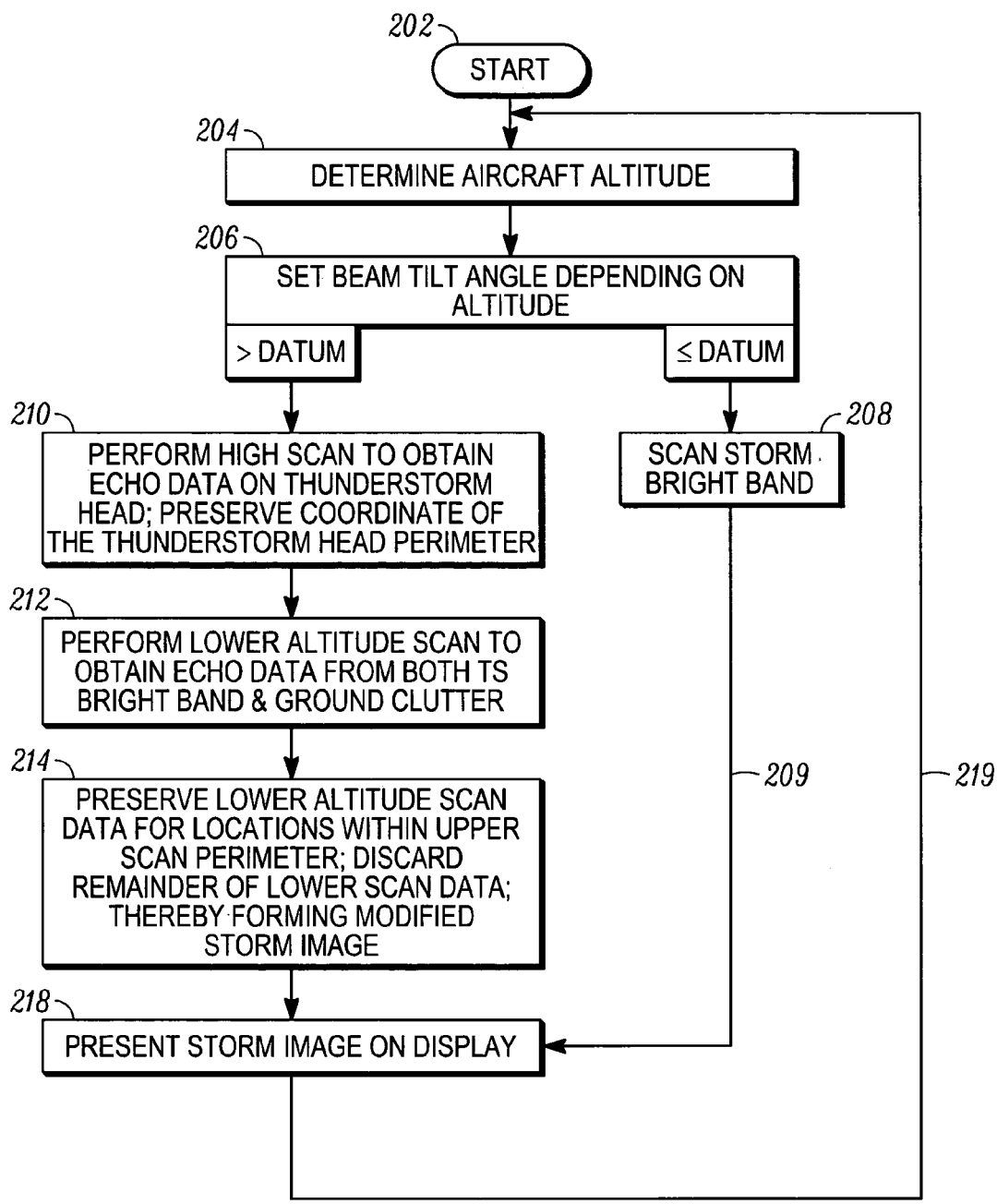
FIG. 9 is a simplified flow chart analogous to that of FIG. 8 but showing additional details according to a yet still further embodiment of the present invention

FIG. 9 shows a simplified flow chart illustrating method 200 of providing weather information to a pilot, showing additional details according to a yet further embodiment of the present invention. Method 200 begins with START 202 and desirable initial DETERMINE AIRCRAFT ALTITUDE step 204. The information obtained in step 204 is then used to set the tilt angle of beam 301 depending upon the altitude found in step 204, using the information in Table I. If the altitude is equal or less than the datum altitude (e.g., about 15,000 feet) then step 208 analogous to step 108 is executed and method 100 advances to step 218 wherein the radar return echoes obtain in step 208 are presented on display 34. If the aircraft altitude is above the datum altitude, then step 210 is executed using the tilt angle determined from Table I to perform a high "upper beam" scan to obtain radar echo data on the thunderstorm head and preserve the coordinates of the thunderstorm head perimeter, i.e., perimeter 47' if unexpanded and perimeter 47 if expanded as previously discussed depending upon the desires of the designer or user. In step 212, which may be performed before or after step 210, a lower altitude, "lower beam" scan is performed to obtain radar echo data both from bright band 406 of thunderstorm 40 and from associated terrain features 39 (i.e., the ground clutter). In step 214, the lower altitude scan data that lies within the upper scan perimeter 47', 47 is preserved and the remainder, that is, the data from objects lying laterally outside the high scan perimeter, are discarded, thereby forming modified storm image 67 that is presented on display 34 in step 218. Method 200 then returns to START 202 and initial step 204 as indicated by path 219.

While operation of the radar system of FIG. 1 according to embodiments of the present invention illustrated in FIGS. 4–9 has been described in terms of upper beam and lower beam scan angles illustrated in Table I, persons of skill in the art will understand that such scan angles are to some extent hardware dependent. Accordingly, the optimum angles for performing the upper beam and lower beam thunderstorm scans described herein may vary somewhat, for example, depending upon the vertical beam width of various radars. Stated more generally, the upper beam scans should be made at beam angles that allow the beam to intersect the thunderstorm so that the lower edge of the radar beam does not strike the ground within the display range setting. This insures that the storm image provided by such upper beam scan will be clutter free, whether directed at the storm as a whole from lower altitudes or at the storm head from upper altitudes. The energy intensity in the radar beam drops off as the angle from the beam center 3011 increases, with the greatest energy concentrated in a region of the radar beam around beam center 3011, i.e., central region 3015 of the beam. Accordingly, as used herein the "lower beam edge" or "lower beam edge angle" refers to angular location 3013 of the lower part of the beam where its intensity has dropped below a threshold intensity able to produce significant echoes from ground features for the particular sensitivity and range settings being employed. Persons of skill in the art can readily determine without undue experimentation the particular angles that meet this criterion for their particular radar at various altitudes. The second or lower beam scan occurs at beam angles where lower beam edge 3013 strikes the ground within the range setting being employed so that significant ground clutter is mixed in with the thunderstorm returns. Again, persons of skill in the art can readily determine without undue experimentation the particular angles that meet this criterion for their particular radar at various altitudes and range settings. Where the aircraft altitude, vertical beam width and range setting permits a scan of the body of the thunderstorm without lower beam edge 3013 striking ground 38 and terrain features 39 within the display range setting thereby providing radar echoes substantially free of ground clutter 43, then the resulting thunderstorm image can be presented substantially directly on the display. Where the aircraft altitude and vertical beam width do not permit a scan of the body of the thunderstorm without lower beam edge 3013 substantially striking ground 38 and terrain features 39 within the display range setting so that the resulting image is not free of ground clutter 43, then a two step scan process is used; i.e., a first "upper beam" storm-head scan with a vertical tilt angle that prevents lower beam edge 3013 from striking ground 38 and terrain features 39 within the display range setting at that altitude and where the central region of the beam can detect the storm head and a second "lower beam" scan wherein the vertical tilt angle and vertical beam width are such that lower beam edge 3013 does strike ground 38 and terrain features 39 within the range setting and central region 3015 of the beam can detect the storm body, including bright band 406 of the storm. The first scan results are used to provide a substantially clutter-free storm image mask that is applied to the results of the second scan to remove the ground clutter echoes lying laterally outside the storm-head perimeter determined in the first scan or a laterally expanded version of such storm-head perimeter. Colorization is desirably applied to the resulting image so that the outer periphery corresponds to lower intensity precipitation and the center to higher intensity precipitation.

Referring again to FIGS. 5–7 and 8–9, while preferred embodiments of the invention employ initial steps 104–106 in method 100 and 204–206 in method 200, thereby leading to the sequence of steps 110–118 or 108, 118 in method 100, and 210–218 or 208, 218 in method 200, this is not essential. Knowing the aircraft altitude so that the beam angles may be appropriately set for the upper and lower scans, according to a still further embodiment of the present invention, steps 110–118 or 210–218 alone will yield clutter free image 67 of thunderstorm 40. Steps 106–108 and 206–208 while convenient are not essential to the present invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a radar system to provide an image of a storm to a pilot of an aircraft, the storm including at least a bright band region and a body, the method comprising the steps of:

determining an altitude of the aircraft;

if the altitude is equal to or less than a predetermined datum altitude:

scanning, with a radar beam, at least the bright band region of the storm without a significant portion of the radar beam striking nearby terrain features to provide a substantially ground clutter free storm image;

if the altitude is greater than the predetermined datum altitude:

performing at least a first scan and a second scan, wherein the first scan is aimed at an upper portion of the storm so as to determine a storm head perimeter substantially free of ground clutter, and the second scan is aimed at the storm body so as to determine a radar image of the storm body and any associated ground clutter;

preserving radar echoes from the second scan that lie on or within the storm head perimeter, and discarding any radar echoes from the second scan that lie outside the storm head perimeter to provide a substantially ground clutter free storm image; and presenting the substantially ground clutter free storm image to the pilot.

2. The method of claim 1, further comprising prior to the presenting step, modifying the storm image so that it has a first color indicative of strong echoes in a central region of the image and a second color indicative of weaker echoes in a peripheral region near the perimeter.

3. The method of claim 2, wherein the peripheral region comprises about 5–25% of the area of the storm image.

4. The method of claim 2, further comprising prior to the preserving step, expanding the storm head perimeter by a predetermined amount so that the preserving and discarding steps are carried out with respect to the expanded perimeter.

5. The method of claim 4, wherein the expanding step comprises expanding the lateral dimensions of the storm head by about 5–15%.

6. The method of claim 1, further comprising prior to the preserving step, expanding the storm head perimeter by a predetermined amount so that the preserving and discarding steps are carried out with respect to the expanded perimeter.

7. The method of claim 6, wherein the expanding step comprises expanding the lateral dimensions of the storm head by about 5–15%.

8. The method of claim 6, further comprising prior to the presenting step, further modifying the storm image so that it has a first color indicative of strong echoes in a central region of the image and a second color indicative of weaker echoes in a peripheral region near the perimeter.

9. A radar system adapted to provide substantially ground clutter free storm image information to a pilot, comprising:

an antenna for emitting and receiving radar signals;

a radar transmitter/receiver (T/R) coupled to the antenna for generating outgoing radar signals and receiving incoming radar echoes of the storm;

an antenna steering control (ASC) coupled to the antenna for steering the outgoing radar signal;

a processor coupled to the radar transmitter/receiver and the antenna steering control for managing the radar transmitter/receiver and the antenna steering control to direct the outgoing radar signal in particular directions in space;

an aircraft flight data system (AFDS) coupled to the processor for providing current flight parameter information to the processor;

a memory coupled to the processor for storing operating instructions for the processor and for storing a data matrix of return echo intensity and location information received from storm cells at particular azimuthal (X), elevation (Y) and range (R) coordinates in space within the storm;

a display coupled to the processor for receiving from the processor a storm image for presentation to the pilot;

wherein the processor manages the radar transmitter/ receiver, antenna steering control, and antenna in accordance with instructions and parameters stored in the memory and directs the radar beam at the storm at an angle and range setting that depends upon the current flight parameters so that;

for altitudes at or below a predetermined altitude level, radar scanning the storm with an upward tilted beam to include a central region of the storm without created significant ground clutter and passing the resulting radar image to the display; and for altitudes above a predetermined level, performing two or more scans, a first scan aimed at an upper region of the storm to provide a storm head perimeter substantially free of ground clutter; and a second scan aimed at a body region of the storm and surrounding terrain features; and wherein the processor combines results of the first and second scans to discard data from the second scan that lies laterally outside the perimeter determined from the first scan.

10. The system of claim 9, wherein prior to combining the results of the first and second scans, the processor expands the perimeter determined in the first scan by a predetermined amount and uses the expanded perimeter in discarding data from the second scan.

11. The system of claim 10, wherein the processor laterally expands the perimeter determined in the first scan by about 5–15% of the lateral dimension of the perimeter.

12. The system of claim 9, wherein the processor colonizes and grades the storm image so that a central region color indicates strong storm echoes and a peripheral region color adjacent the perimeter indicates weak storm echoes.

13. The system of claim 12, wherein the peripheral region occupies about 5–25% of the storm image area.

14. The system of claim 9, wherein the processor removes any residual clutter from prominent ground features using a low-pass filter.

15. A method for displaying a storm image within a selected range ahead of an aircraft, using an airborne radar projecting a radar beam having a central portion and a lower beam edge, comprising:

in either order,
scanning the radar beam at a first higher beam angle so that the central beam portion provides a first image of a head of the storm without the lower beam edge intersecting the ground within the selected range;

scanning the radar beam at a second lower beam angle to obtain a second image comprising the storm body illuminated at least in part by the central beam portion and ground clutter from the lower beam edge intersecting the ground within the selected range;

creating a modified storm image from the second image by discarding those portions of the second image that lie laterally outside the first image; and presenting the modified storm image on the display.

16. The method of claim 15, further comprising prior to the first scanning step, determining the altitude of the radar above ground level.

17. The method of claim 16, further comprising prior to or during the creating step, expanding the first image by a predetermined amount and using the expanded image in the discarding step.

18. The method of claim 17, wherein the predetermined amount comprises 5–15% of the lateral dimensions of the first image.

19. The method of claim 16, further comprising prior to the presenting step, colorizing the modified storm image so that a peripheral portion has one or more first colors indicative of weaker precipitation and a central region has one or more second colors indicative of stronger precipitation.

20. The method of claim 19, wherein the peripheral region comprises about 5–25% of the area of the modified image.

* * * * *